2,866,759

COMPOSITION FOR TREATING WATER

Oliver Bacon, Tampa, Fla., assignor to Warren C. Horton, Chicago, Ill.

No Drawing. Application May 10, 1955
Serial No. 507,506

5 Claims. (Cl. 252—175)

My invention relates to a composition for treating water, or more specifically, for clarifying, softening and decolorizing water.

The two most commonly used materials for clarifying and decolorizing water are aluminum sulfate and a sodium aluminate composition identified in the trade as "electro-catalyst." In the pH range of 6.8 to 8.0, both of these compounds form flocs which entrain impurities and settle out. If the color is due to organic contamination, the organic matter forms an insoluble complex with the aluminum salt and will precipitate out at a lower pH.

Aluminum sulfate, being an acid salt, requires either a water basic in reaction to start with in order to stay within the pH range above, or the water must be made basic by the addition of lime or soda ash.

The aluminate, by virtue of being a basic salt, accomplishes a certain softening of the water, and the addition of lime or soda ash in the alum process likewise achieves a certain softening. The difficulty with both these clarification processes is that the aluminate and aluminum sulfate are relatively expensive in the quantities required.

My invention has as a major object the provision of a composition of matter which can soften, clarify and decolorize water to the same extent as the alum and "electro-catalyst" processes, but wherein a given quantity of water may be treated at much less expense.

Other important advantages of my invention are that the softening reaction appears to be accelerated and the settling is faster, so that the effective capacity of the treating plant is increased. It avoids after-precipitation and produces a clear and stable water so that the load on the filters is eased and the filter runs extended. It has no deleterious effect on the water.

Other objects of my invention will be apparent from the following description.

My composition, in general, consists of:

20 to 70% limestone,
5 to 20% sodium hydroxide,
5 to 20% sodium aluminate,
20 to 70% either aluminum sulfate, ferric sulfate, or ferrous sulfate.

I use finely divided limestone of about 50 (fifty) mesh and having about a 5% water content. The sodium hydroxide is a technical grade having an NAOH content of 76%. The sodium aluminate is the commercial product formed by the fusion process and having a purity of 94.8%. It of course is the dry product. The aluminum sulfate is that identified as "water works alum" containing 17% $Al_2O_3$. Technical grades of ferrous and ferric sulfate are employed.

My composition is formed by first mixing together the sodium hydroxide and sodium aluminate. Thereafter, the limestone is added and the three components are thoroughly mixed, at which time a temperature rise in the mixture is experienced of approximately 100° F. above ambient. After the mixture has cooled, the acid salt (the aluminum, ferric or ferrous sulfate) is added to the mixture and the mixture is again thoroughly mixed. The end product is free-flowing and neither deliquescent nor hydroscopic.

With in the general formulation given above, I have found two specific formulations which give excellent results and whose costs are low. These are:

(No. 1):
  50% limestone,
  30% aluminum sulfate,
  10% sodium hydroxide,
  10% sodium aluminate.

(No. 2):
  40% limestone,
  40% alum,
  10% sodium hydroxide,
  10% sodium aluminate.

Laboratory tests were conducted on these formulations in direct comparison with the raw waters of three different localities. One of these localities employed the alum treatment for water clarification. The other two employed the "Electro-Catalyst" treatment. Both of my compositions were tested against the standard treatment given the waters by their respective water plants. My compositions were tested in various concentrations, but in the table below, only the least concentrations giving the desired results are shown.

800 milliliters of untreated water were used as samples. Preliminary additions of lime in the case of two of the waters and lime and soda ash in the case of the third were made to all the raw water samples in the proportion currently employed in the respective water treatment plants. One of the samples of each water then received the appropriate additions of alum or "electro-catalyst." The other samples of each water were divided into two lots, one of which was treated with different quantities of my composition No. 1 and the other with different quantities of my composition No. 2. As stated above, the table shows only those samples treated with the least quantities of my compositions giving the desired results.

After such additions, all samples were stirred for a period of thirty minutes, at which time the stirring devices were removed. Thirty minutes after the stirring had ceased, available and total alkalinity and pH determinations were made. All samples likewise had settled clear during this first thirty-minute period. The samples were then permitted to stand for a further thirty minutes, at the end of which the hardness of the water was determined. The samples were then permitted to stand further for a three-day period to detect after-precipitation. None of the samples showed any evidence of after-precipitation at the end of this period.

The following table describes my results:

Table No. 1

| Sample No. | Water "A" | | | Water "B" | | | Water "C" | | |
|---|---|---|---|---|---|---|---|---|---|
| | 1[1] | 2 | 3 | 1[1] | 2 | 3 | 1[1] | 2 | 3 |
| Material: | | | | | | | | | |
| Lime ......................cc.. | 12.67 | 12.67 | 12.67 | 5.5 | 5.5 | 5.5 | 18.6 | 18.6 | 18.6 |
| Soda Ash .................cc.. | | | | | | | 10.0 | 10.0 | 10.0 |
| Aluminum sulfate .........cc.. | | | | | | | 1.75 | | |
| Electro-Catalyst ..........cc.. | 0.235 | | | 0.18 | | | | | |
| Composition #1 ...........cc.. | | 0.394 | | | 0.121 | | | 0.74 | |
| Composition #2 ...........cc.. | | | 0.282 | | | 0.10 | | | 0.577 |
| Test Results | | | | | | | | | |
| Hardness: | | | | | | | | | |
| Start ....................p.p.m.. | 265 | 265 | 265 | 186 | 186 | 186 | 348 | 348 | 348 |
| Finish ...................p.p.m.. | 113 | 110 | 104 | 74.0 | 66.0 | 74 | 146 | 145 | 162.0 |
| pH: | | | | | | | | | |
| Start .................... | 7.3 | 7.3 | 7.3 | 7.3 | 7.3 | 7.3 | 7.3 | 7.3 | 7.3 |
| Finish ................... | 8.4 | 8.4 | 8.3 | 8.5 | 8.4 | 8.6 | 10.7 | 10.6 | 10.1 |
| AA:[2] | | | | | | | | | |
| Start .................... | Trace | Trace | Trace | Trace | Trace | Trace | Trace | Trace | Trace |
| Finish ..................p.p.m.. | Trace | Trace | Trace | Trace | Trace | Trace | 40.0 | 45.0 | 50.0 |
| TA:[3] | | | | | | | | | |
| Start ....................p.p.m.. | 234 | 234 | 234 | 180 | 180 | 180 | 165 | 165 | 165 |
| Finish ...................p.p.m.. | 104 | 104 | 90.0 | 80.0 | 80.0 | 79.0 | 65.0 | 95.0 | 105 |
| Free Alkali, Finish .......... | None | None | None | None | None | None | Trace | | None |
| Equivalent Cost .............. | 39.13 | 27.58 | 19.74 | 29.95 | 8.47 | 7.00 | 66.50 | 51.80 | 40.40 |
| Percent Saving ............... | | 29.5 | 49.6 | | 71.7 | 76.6 | | 22.1 | 39.2 |

[1] Treatment given currently in the municipality from which the raw water was taken.
[2] Available alkalinity.
[3] Total alkalinity.

From the table above, the economic advantage of my compositions can be readily appreciated. It should also be noted that my compositions soften the water somewhat more than the treatment methods now employed. Primarily, however, as far as the factors tested above are concerned, my compositions accomplish the same purpose as the current methods of water treatment, but do so at substantially less cost.

I have further computed that my compositions have a sufficient cost advantage over competing processes and materials such that even including freight factors, water may be treated with my composition at less cost anywhere in the United States than with the conventional treatment materials. It should be noted that while aluminum is less expensive per ton, one carload of my composition is the equivalent for purposes of water treatment to two and one-halfcarloads of alum. A comparable economy of handling costs and storage costs will necessarily follow.

Additionally, I have found that my compositions increase the efficiency of water treatment plants in a variety of ways. They appear to increase the speed of the softening reaction. The floc settles more quickly, thereby increasing the effective capacity of the softening plant. It produces a clear and stable water without after-precipitation, and it has no deleterious effect on the water. It eases the load on the filters and extends the filter runs.

It will be appreciated that the above description of my invention is merely illustrative thereof and not limitative thereon, and I therefore prefer that my invention be regarded as being limited only as set forth in the following claims.

I claim:

1. A composition for the treatment of water comprising an intimate mixture of 20 to 70% limestone, 5 to 20% sodium hydroxide, 5 to 20% sodium aluminate, and 20 to 70% of a hydrolyzable, floc-forming, acid salt of the group consisting of aluminum sulfate, ferric sulfate and ferrous sulfate.

2. A composition for the treatment of water comprising an intimate mixture of 40% limestone, 40% aluminum sulfate, 10% sodium hydroxide, and 10% sodium aluminate.

3. A composition for the treatment of water comprising an intimate mixture of 50% limestone, 30% aluminum sulfate, 10% sodium hydroxide, and 10% sodium aluminate.

4. A composition for the treatment of water comprising an intimate mixture of approximately 40% limestone, 10% sodium hydroxide, 10% sodium aluminate and 40% of a hydrolyzable, floc-forming acid salt of the group consisting of aluminum sulfate, ferric sulfate and ferrous sulfate.

5. A composition for the treatment of water comprising an intimate mixture of approximately 50% limestone, 10% sodium hydroxide, 10% sodium aluminate and 30% of a hydrolyzable, floc-forming acid salt of the group consisting of aluminum sulfate, ferric sulfate and ferrous sulfate.

References Cited in the file of this patent

UNITED STATES PATENTS

| | | |
|---|---|---|
| 629,411 | Wilson | July 25, 1899 |
| 653,008 | Koyl | July 3, 1900 |
| 1,440,253 | Travers | Dec. 20, 1922 |
| 1,679,777 | Moberg | Aug. 7, 1928 |
| 1,918,555 | Partridge | July 18, 1933 |
| 2,102,219 | Raymond | Dec. 14, 1937 |
| 2,284,827 | Lindsay et al. | June 2, 1942 |
| 2,534,284 | Magill | Dec. 19, 1950 |

FOREIGN PATENTS

| | | |
|---|---|---|
| 596,172 | France | Aug. 1, 1925 |
| 236,595 | Switzerland | July 2, 1945 |
| 63,398 | Netherlands | June 15, 1949 |

OTHER REFERENCES

Paper Trade Journal, December 8, 1910, page 42.
Paper Trade Journal, November 27, 1941, page 283.

UNITED STATES PATENT OFFICE

CERTIFICATE OF CORRECTION

Patent No. 2,866,759                                        December 30, 1958

Oliver Bacon

It is hereby certified that error appears in the printed specification of the above numbered patent requiring correction and that the said Letters Patent should read as corrected below.

Column 3, lines 40 and 41, for "aluminum" read -- aluminum sulfate --.

Signed and sealed this 5th day of May 1959.

(SEAL)
Attest:

KARL H. AXLINE
Attesting Officer

ROBERT C. WATSON
Commissioner of Patents